United States Patent
Lee et al.

(10) Patent No.: US 10,264,607 B2
(45) Date of Patent: Apr. 16, 2019

(54) METHOD AND DEVICE FOR PERFORMING RANDOM ACCESS IN WIRELESS COMMUNICATION SYSTEM

(71) Applicant: LG ELECTRONICS INC., Seoul (KR)

(72) Inventors: Sangrim Lee, Seoul (KR); Bonghoe Kim, Seoul (KR); Hyunsoo Ko, Seoul (KR); Yunjung Yi, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/735,586

(22) PCT Filed: Nov. 5, 2015

(86) PCT No.: PCT/KR2015/011854
§ 371 (c)(1),
(2) Date: Dec. 11, 2017

(87) PCT Pub. No.: WO2017/007074
PCT Pub. Date: Jan. 12, 2017

(65) Prior Publication Data
US 2018/0317260 A1    Nov. 1, 2018

Related U.S. Application Data

(60) Provisional application No. 62/188,489, filed on Jul. 3, 2015.

(51) Int. Cl.
*H04W 74/08* (2009.01)
*H04W 72/04* (2009.01)

(52) U.S. Cl.
CPC ....... *H04W 74/0833* (2013.01); *H04W 72/04* (2013.01); *H04W 72/0413* (2013.01); *H04W 72/0446* (2013.01); *H04W 74/08* (2013.01)

(58) Field of Classification Search
None
See application file for complete search history.

(56) References Cited

U.S. PATENT DOCUMENTS

| 2008/0101306 A1* | 5/2008 | Bertrand | H04L 27/2613 370/336 |
| 2010/0182924 A1* | 7/2010 | Hong | H04B 7/18591 370/252 |

(Continued)

FOREIGN PATENT DOCUMENTS

| KR | 20120023511 | 3/2012 |
| KR | 20130031126 | 3/2013 |

(Continued)

OTHER PUBLICATIONS

PCT International Application No. PCT/KR2015/011854, Written Opinion of the International Searching Authority dated Mar. 28, 2016, 4 pages.

(Continued)

*Primary Examiner* — Anh Ngoc M Nguyen
(74) *Attorney, Agent, or Firm* — Lee, Hong, Degerman, Kang & Waimey

(57) ABSTRACT

A method and a device for performing a random access in a wireless communication system are provided. Specifically, a wireless resource for transmitting a first random access request is selected, and the first random access request is transmitted through the wireless resource. The first random access request includes a transmission period of the first random access request, the frequency of retransmission, and an allowable error of the transmission period. Uplink resource allocation information is received in response to the first random access request. The uplink resource allocation information includes information on an indicator bit and a wireless resource shift. When the indicator bit is a preset (Continued)

value, a second random access request is transmitted through a wireless resource shifted from the wireless resource.

9 Claims, 13 Drawing Sheets

(56) References Cited

U.S. PATENT DOCUMENTS

| | | | | |
|---|---|---|---|---|
| 2010/0254340 | A1* | 10/2010 | Park | H04W 72/1284 |
| | | | | 370/329 |
| 2014/0050157 | A1* | 2/2014 | Korhonen | H04W 74/006 |
| | | | | 370/329 |

FOREIGN PATENT DOCUMENTS

| | | |
|---|---|---|
| KR | 20140033773 | 3/2014 |
| KR | 20140083989 | 7/2014 |

OTHER PUBLICATIONS

3rd Generation Partnership Project (3GPP), "Technical Specification Group Radio Access Network; Evolved Universal Terrestrial Radio Access (E-UTRA); Physical layer procedures (Release 10)" 3GPP TR 36.213 V10.1.0, Mar. 2011, 117 pages.

* cited by examiner

METHOD AND DEVICE FOR PERFORMING RANDOM ACCESS IN WIRELESS COMMUNICATION SYSTEM

CROSS-REFERENCE TO RELATED APPLICATIONS

This application is the National Stage filing under 35 U.S.C. 371 of International Application No. PCT/KR2015/011854, filed on Nov. 5, 2015, which claims the benefit of U.S. Provisional Application No. 62/188,489, filed on Jul. 3, 2015, the contents of which are all hereby incorporated by reference herein in its entirety.

BACKGROUND OF THE INVENTION

Field of the Invention

The present specification relates to wireless communication, and more particularly, to a method of performing a random access in a wireless communication system, and a device using the method.

Related Art

The next generation multimedia wireless communication system, which has recently been very actively and extensively researched and developed, is being request to be evolved as a system that can process and transmit diverse information, such as images, wireless data (or radio data), and so on, excelling the initial voice-based services. For example, hologram and real-time UHD high picture quality services, which can provide higher transmission rates by using a larger amount of frequency resource as compared to the conventional wideband services. Additionally, mission critical services requesting low latency, emergency services or tactical internet service requesting ultimately low latency, and services such as V2X are being requested. Furthermore, massive machine communication, sensor networks, and so on, for supporting a massive number of devices are also be requested.

The purpose of such next generation wireless communication system is to allow reliable communication to be carried out regardless of the position and mobility of multiple users. However, the wireless channel has non-ideal characteristics, such as path loss, noise, fading caused by a multi-path, Inter Symbol Interference (ISI), or a Doppler effect caused by the mobility of the device. A wide range of technology is being researched and developed in order to overcome such non-ideal characteristics of the wireless channel and to enhance reliability in wireless communication.

In addition, with the development of information technologies, there is a growing popularity in Internet of things (IoT). The IoT is a network consisting of many devices connected to each other. The IoT has intelligent cognition, identification, and interconnection capabilities, and is a part of a computer and Internet-based information industry.

Herein, a random access method in a cellular IoT (CIoT) based on a cellular network in the IoT is described. In particular, if there is a random access request of a plurality of terminals, it is required to mitigate a collision of time/frequency resources between the terminals.

SUMMARY OF THE INVENTION

The present specification provides a method and device for performing a random access in a wireless communication system.

The present specification proposes a method of performing a random access of a terminal in a wireless communication system.

First, terminologies are summarized. A first random access request corresponds to a case where a terminal first attempts a random access A second random access request corresponds to a case where the terminal attempts the random access again in a next transmission period of the first random access request. A radio resource corresponds to an RACH resource. When it is said that the first random access request and the second random access request are transmitted through the radio resource, it means that a random access attempt is successful.

First, a radio resource for transmitting the first random access request is selected. That is, the RACH resource is selected.

The first random access request is transmitted through the radio resource. The first random access request includes a transmission period of the first random access request, the number of times of retransmitting the first random access request, and an error tolerance of the transmission period of the first random access request.

The transmission period of the first random access request is a period of retransmitting the random access request. Herein, it corresponds to a time between the transmission time of the first random access request and the transmission time of the second random access request. The number of times of retransmitting the first random access request is the number of times of attempting a random access until the first random access request is successfully transmitted. The error tolerance of the first random access request is a measure of determining how sensitive the terminal is with respect to time (for example, an error of one minute is tolerable even if information must be transmitted every one hour).

Uplink resource allocation information is received in response to the first random access request. The uplink resource allocation information includes an indication bit and information regarding a radio resource shift.

If the terminal supports an asynchronous transmission mode, the terminal generates a random number and transmits the first random access request to a base station. Uplink resource allocation information further including the random number is received from the base station which has received the first random access request, and thereafter data is transmitted through a corresponding resource. In this case, timing advance (TA) information related to a timing synchronization with the base station is not received. That is, the terminal performs a random access for the base station without receiving the TA information from the base station.

If the first random access request of the terminal is successfully transmitted, the base station determines an indication bit on the basis of the number of times of retransmitting the first random access request and an error tolerance of a transmission period of the first random access request. According to the number of times of retransmitting the first random access, the base station may inversely estimate a specific time duration in which the terminals intensively attempt the random access. In addition, according to the transmission period of the first random access request, it may be predicted whether a random access request to be transmitted at a later time is collided. In addition, according to the error tolerance of the transmission period of the first random access request, a radio resource zone to be shifted may be determined.

If the indication bit is not a predetermined value, the second random access request is transmitted through a radio resource shifted from a radio resource for transmitting the first random access request. The fact that the indication bit is not the predetermined value means that the radio resource needs to be shifted since there is a collision. On the other hand, if the indication bit is the predetermined value, there is no collision and thus a radio resource currently in use is sufficient. Therefore, a second random access request of a next cycle is transmitted through the radio resource for transmitting the first random access request.

If the number of times of retransmitting the first random access request exceeds a threshold and a time at which the first random access request is successfully transmitted is out of the error tolerance of transmission period of the first random access request, the indication bit is not the predetermined value. In addition, the radio resource is randomly shifted on the basis of the radio resource shift information received from the base station. The radio resource shift information indicates a radio resource within the error tolerance of the transmission period of the first random access request. That is, the base station indicates a radio resource zone within the error tolerance of the transmission period of the first random access request, and the terminal randomly determines the radio resource in the radio resource zone through the radio resource shift information received from the base station.

On the other hand, if the number of times of retransmitting the first random access request does not exceed the threshold and the time at which the first random access request is successful is not out of the error tolerance of the transmission period of the first random access request, the indication bit is the predetermined value.

In addition, the present specification also proposes a terminal for performing a random access in a wireless communication system.

The terminal includes a radio frequency (RF) unit for transmitting and receiving a radio signal and a processor operatively coupled to the RF unit. The processor selects a radio resource for transmitting a first random access request, and transmits the first random access request through the radio resource. The first random access request includes a transmission period of the first random access request, the number of times of retransmitting the first random access request, and an error tolerance of the transmission period of the first random access request. In addition, uplink resource allocation information is received in response to the first random access request. The uplink resource allocation information includes an indication bit and information regarding a radio resource shift. In addition, if the indication bit is not a predetermined value, the second random access request is transmitted through a radio resource shifted from the radio resource for transmitting the first random access request.

A base station collects information indicating that a terminal attempts a random access request many times in a specific time duration and informs information regarding a time/frequency resource shift by considering an error tolerance of a period for attempting the random access request, thereby decreasing a probability that a resource collision occurs between the terminals.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
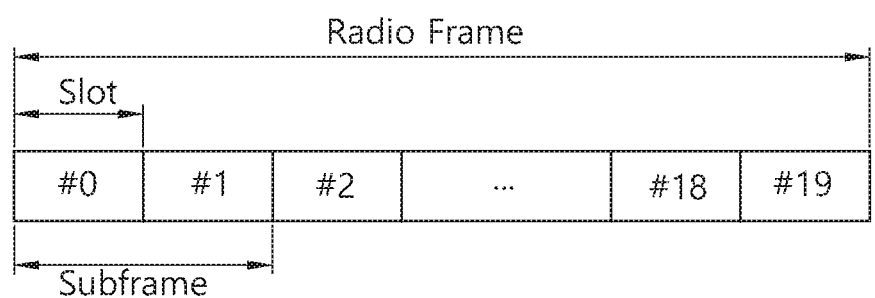
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
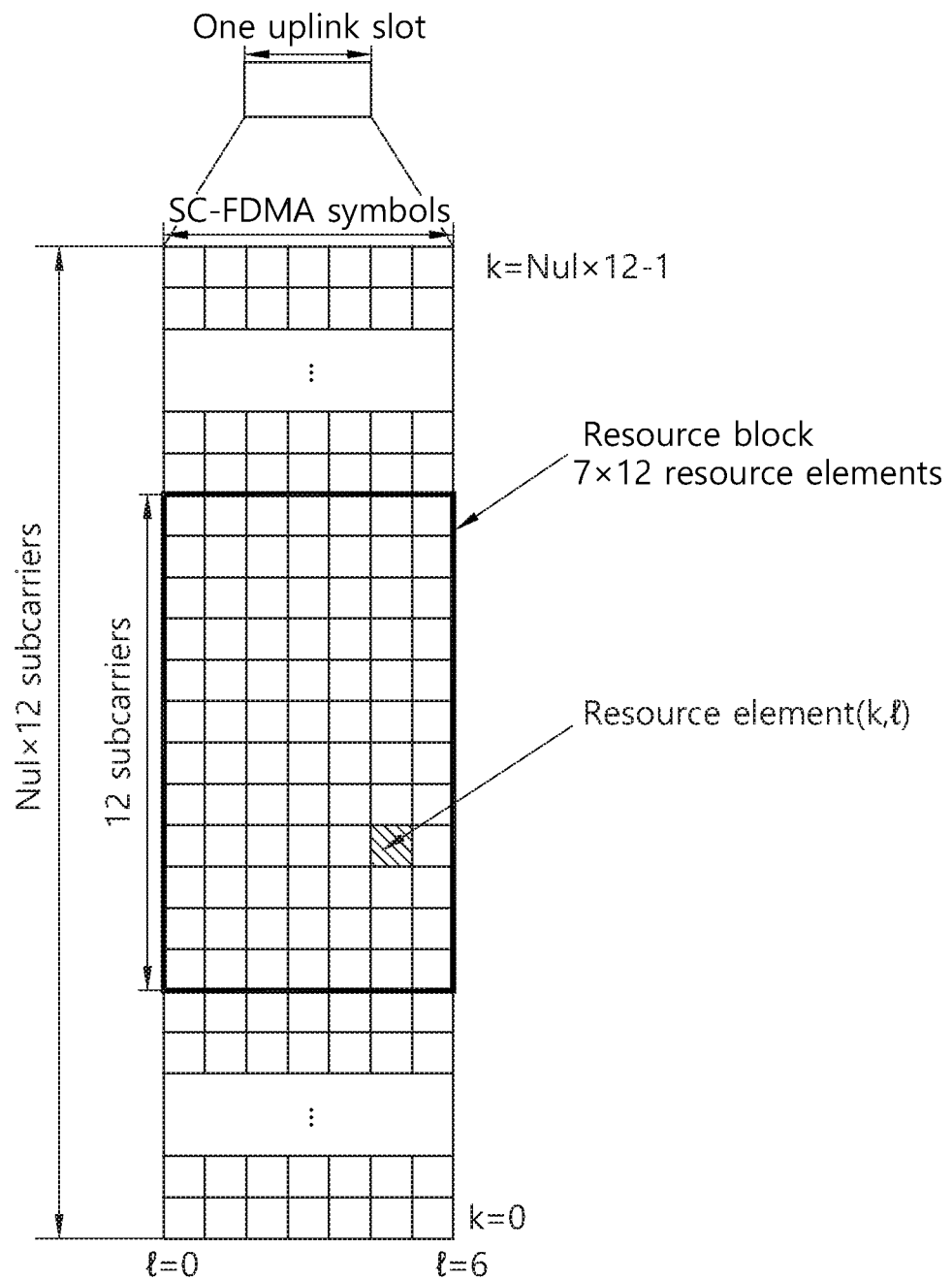
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
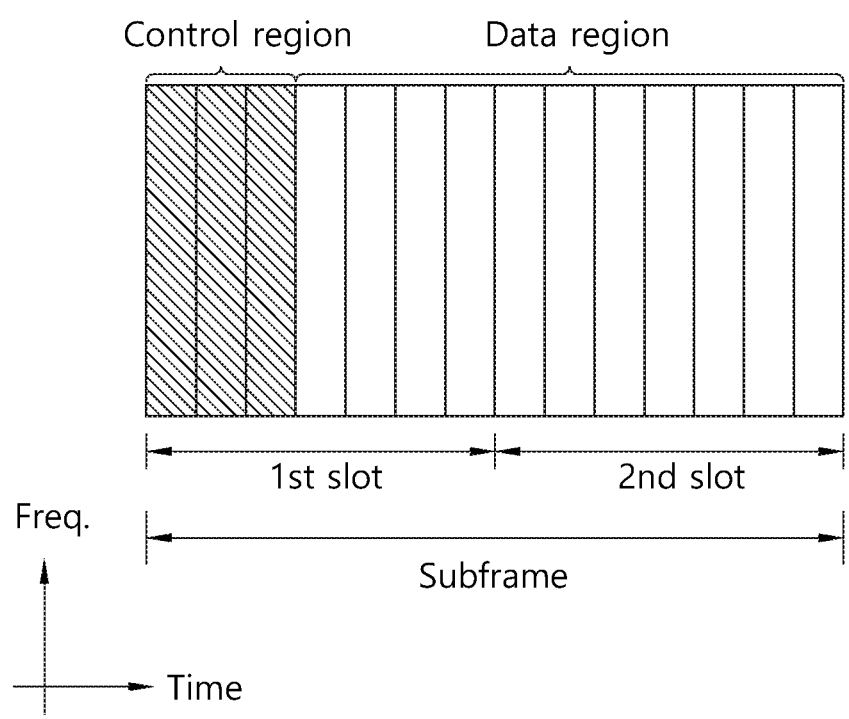
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three 01-DM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a random access procedure is described.

In an LTE system, one or more cells are disposed in one base station in general. A plurality of UEs may be located in one cell. In order for the UE to access a network, a random access procedure is performed in general. The UE may perform the random access procedure on the network for the purpose of: 1) an initial access; 2) a handover; 3) a scheduling request; 4) a timing synchronization, or the like. However, this is only one example, and thus the purpose of performing the random access procedure may vary depending on a system.

The random access procedure in the initial access is as follows. The UE is powered on to attempt a first access to a new cell. The UE adjusts a downlink synchronization, and receives system information in a cell to be accessed. The UE uses the random access procedure since it is in a state where a timing synchronization with the network is not matched at present and an uplink radio resource is not ensured. That is, the UE requests the network to provide a radio resource for transmitting an access request message by using the random access procedure. In addition, upon receiving a corresponding radio resource request, the network allocates a proper radio resource to the UE. The UE may transmit the access request message to the network through the allocated radio resource.

The random access procedure may be classified into a contention-based random access procedure and a non-contention-based random access procedure. A greatest difference between the contention-based random access procedure and the non-contention-based random access procedure is whether a signature used in the random access preamble is dedicatedly designated to one UE. In the non-contention-based random access procedure, since the UE uses the dedicate signature designated only to the UE as the random access preamble, a collision with another UE does not occur. Herein, the collision means that two or more UEs attempt the random access procedure simultaneously by using the same random access preamble. In the contention-based random access procedure, there is a possibility of collision because the UE randomly selects a shared signature and uses it as the random access preamble. Herein, the UE may transmit the selected random access preamble to the network through a random access channel (RACH).

However, the random access procedure in a CIoT system based on the present specification is slightly different from the aforementioned typical random access procedure. Specifically, the UE starts the random access procedure by transmitting a random access request of a data format instead of transmitting the random access preamble through an RACH. The random access preamble is not data but only a simple sequence. In addition, the transmitting of the random access request through the RACH is always designed in a form of a slotted Aloha type contention-based RACH. The slotted Aloha type means that transmission starts at a slot boundary by splitting time into slots. In addition, a primary traffic model performs periodic transmission of mobile autonomous reporting (MAR). According to a characteristic of periodic traffic, there is a high probability that all traffic will be concentrated at one point. For example, in case a monitoring system which measures and compares temperatures at various locations in a specific region, temperature information shall be measured and transmitted to a server at the same time. That is, a device which measures all temperatures is highly likely to transmit the temperature information at the same time such as 1 o'clock, 2 o'clock, and 3 o'clock.

The problem is that, when the number of UEs is significantly great in the random access through the contention-based RACH, a collision rate increases and the number of times of performing retransmission increases, which leads to an inefficient random access of the UE.

The collision rate is calculated by the following equation.

$$1-\exp(-\lambda)-\lambda*\exp(-\lambda) \quad \text{[Equation 1]}$$

Herein, $\lambda$ denotes the number of UEs which attempt a random access per one burst. Therefore, $\lambda$ is calculated as follows.

$\lambda$=(the average number of UEs attempting RACH per 1 second)×(RACH burst length)/(the number of subcarriers on which RACH is possible)/(a ratio of a time allocated for RACH against a total time)

For example, a length of an RACH burst of a coverage class corresponding to MCL=164 dB corresponds to 320 ms. If MCL=144 dB, the length of the RACH burst is 40 ms, and if MCL=154 dB, the length of the RACH burst is 40 ms. Assuming a case of FFR-3, 12 subcarriers out of 36 subcarriers in total may be used for the random access. If it is assumed that the number of UEs per sector considered in CIoT is 52547, and a transmission period is 30 minutes (5%), 1 hour (15%), 2 hours (40%), and 1 day (40%), then the number of UEs attempting an RACH per 1 second is 6.81 devices/sec on average. In this case, $\lambda$=6.81*0.32/12=0.182, and the collision rate $P_C$=1.46%.

However, the aforementioned case is based on the assumption that all time resources are allowed for the RACH, and time allocation for the RACH is reduced to transmit data in practice. For example, in case of the RACH burst, information of 40 bits (5 bytes) is transmitted. On the contrary, since 20 bytes to 200 bytes are assumed in case of data in the CIoT, as a result, even if a data size is a smallest size, i.e., 20 bytes, about 4 times more resources than RACH resources are further required. This is because a CIoT system transmits a random access request of a data format through the RACH. If it is assumed that an allocation time ratio for the RACH out of the total time is 20% (5 bytes: 20 bytes), then $\lambda$=0.908 and $P_C$=23.05%. In addition, an increase in the number of UEs, a decrease in the allocation time of the RACH, an increase in the data size, and the like may lead to a further increase in the collision rate.

In order to solve the aforementioned problem, a method of reducing a collision probability of a random access by utilizing a periodicity of traffic transmission of a UE is described below.

Figure 4:
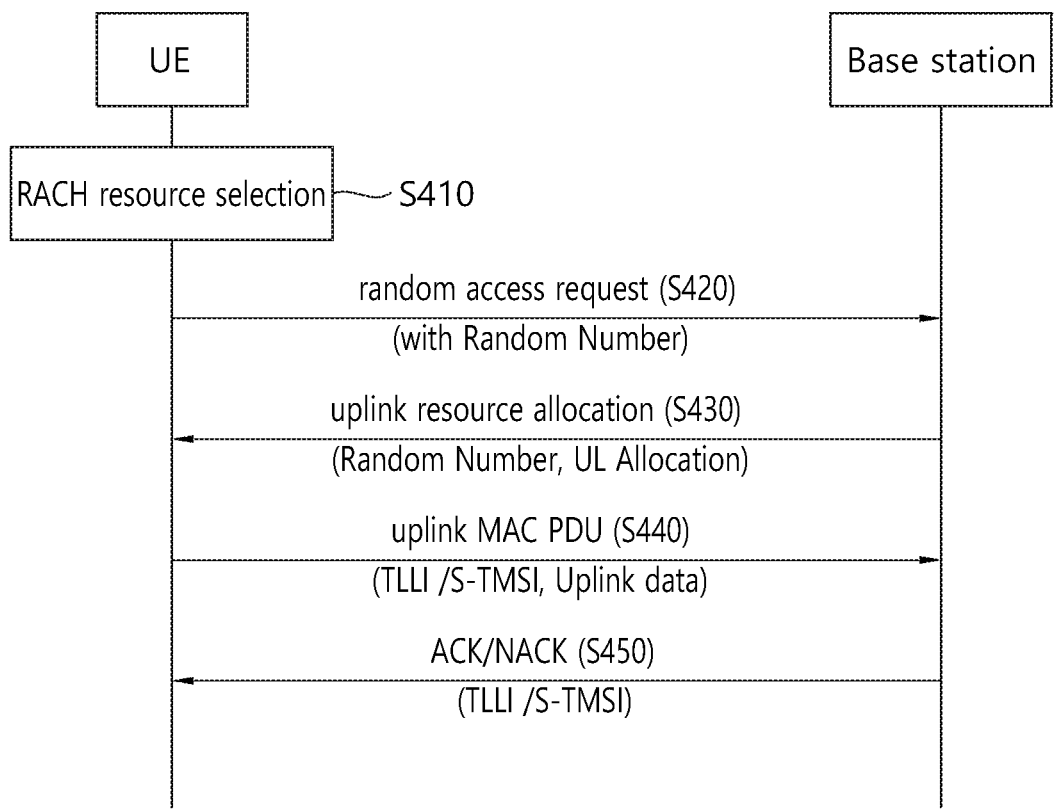
FIG. 4 shows a random access procedure at an initial access in a CIoT system.
Figure 5:
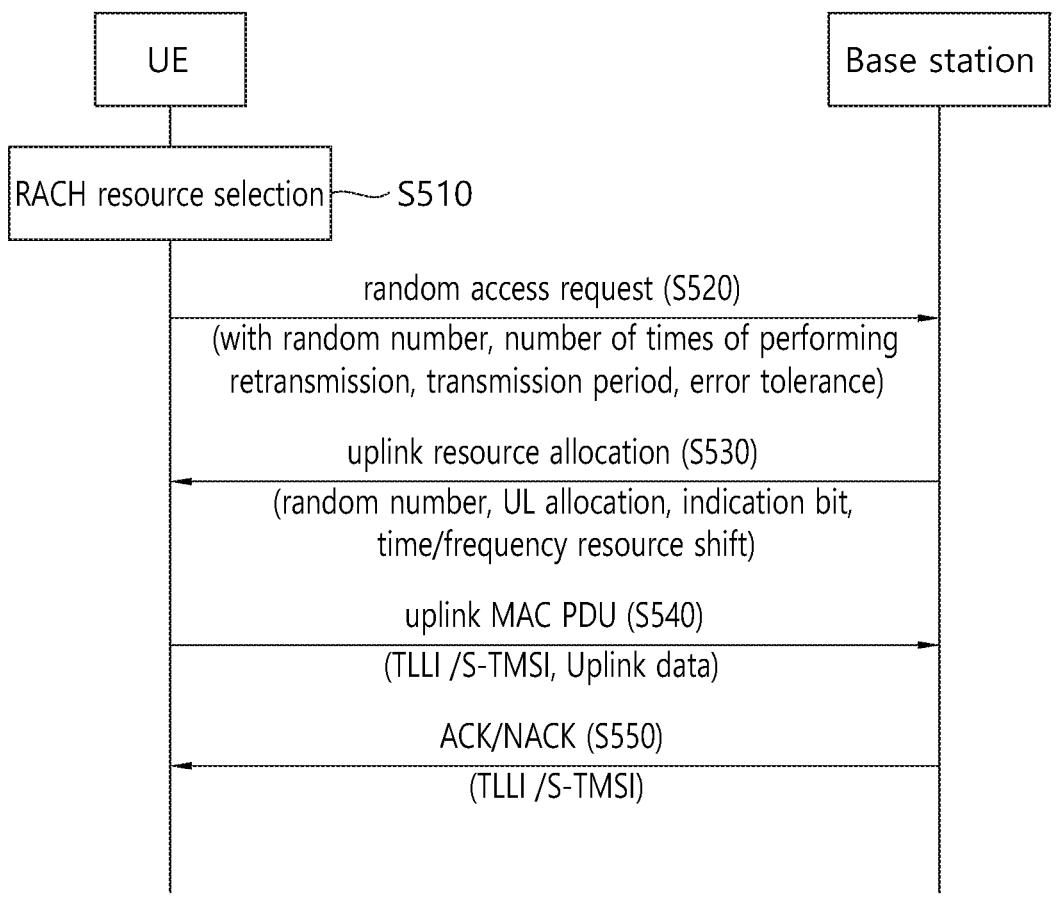
FIG. 5 shows a random access procedure at an initial access in a CIoT system.

FIG. 4 and FIG. 5 show a random access procedure at an initial access in a CIoT system.

FIG. 4 shows a random access procedure not utilizing a periodicity of traffic transmission, and FIG. 5 shows a random access procedure utilizing the periodicity of traffic transmission.

Referring to FIG. 4, first, in step S410, a UE selects an RACH resource for transmitting a random access request. In step S420, the UE transmits a random access request together with a random number to a base station. The random access request is a data format, not a preamble format. In step S430, the UE receives information regarding an uplink resource allocation from the base station. The uplink resource allocation includes a random number and an uplink (UL) allocation. If the UE supports an asynchronous transmission mode, the UE receives the random number through the uplink resource allocation information, and does not receive timing advance (TA) information related to a timing synchronization with the base station. That is, the UE performs a random access on the base station without receiving the TA information from the base station.

If a contention resolution of the random access procedure is performed only in steps S420 and S430, the UE transmits uplink MAC PDU (uplink data) to the base station in step S440. In step S450, the base station transmits to the UE an ACK/NACK signal for the uplink data. Unlike an LTE system in which the random access procedure is performed through four steps, the random access procedure for ensuring low power is simplified in two steps (step S420 and step S430) in the CIoT system.

FIG. 5 differs from FIG. 4 in a sense that the same random access procedure or periodicity of traffic transmission is utilized. First, in step S510, a UE selects an RACH resource for transmitting a random access request. In step S520, the UE transmits the random access request together with a random number to a base station. Herein, the random access request includes a transmission period of the random access request, the number of times of continuously retransmitting the random access request, and an error tolerance of the transmission period of the random access request in a data format instead of a preamble.

The number of times of continuously retransmitting the random access request corresponds to the number of times of continuously attempting a random access if the random access request is not properly transmitted due to a collision with another UE. The UE continuously attempts the random access until the random access request is properly transmitted without the collision. That is, the random access attempt is continuously attempted until it is successful irrespective of the transmission period of the random access request. For example, even if the transmission period of the random access request corresponds to every one hour, the UE continuously attempts the random access immediately, and the base station knows the number of times of continuously attempting the random access The error tolerance of the transmission period is a measure of determining how sensitive the UE is with respect to time (for example, an error of one minute is tolerable even if information must be transmitted every one hour).

In step S530, the UE receives information regarding an uplink resource allocation from the base station. The uplink resource allocation includes not only a random number and an uplink (UL) allocation but also an indication bit and information regarding a time/frequency resource shift. In step S520, the base station performs resource scheduling by using the transmission period of the random access request received in step S520, the number of times of continuously retransmitting the random access request, and the error tolerance of the transmission period of the random access request. If the indication bit is 1, it is scheduled such that the UE can directly use a radio resource for transmitting the random access request also in a next period. On the other hand, if the indication bit is 0, it is scheduled such that the UE can use a resource shifted from the radio resource for transmitting the random access request also in the next period. Accordingly, a random access collision probability between UEs can be decreased. In addition, if the UE supports an asynchronous transmission mode, the UE receives the random number through the uplink resource allocation information, and does not receive timing advance (TA) information related to the timing synchronization with the base station. That is, the UE performs a random access on the base station without receiving the TA information from the base station.

If a contention resolution of the random access procedure is performed only in steps S520 and S530, the UE transmits uplink MAC PDU (uplink data) to the base station in step S540. In step S450, the base station transmits to the UE an ACK/NACK signal for the uplink data.

Figure 6:
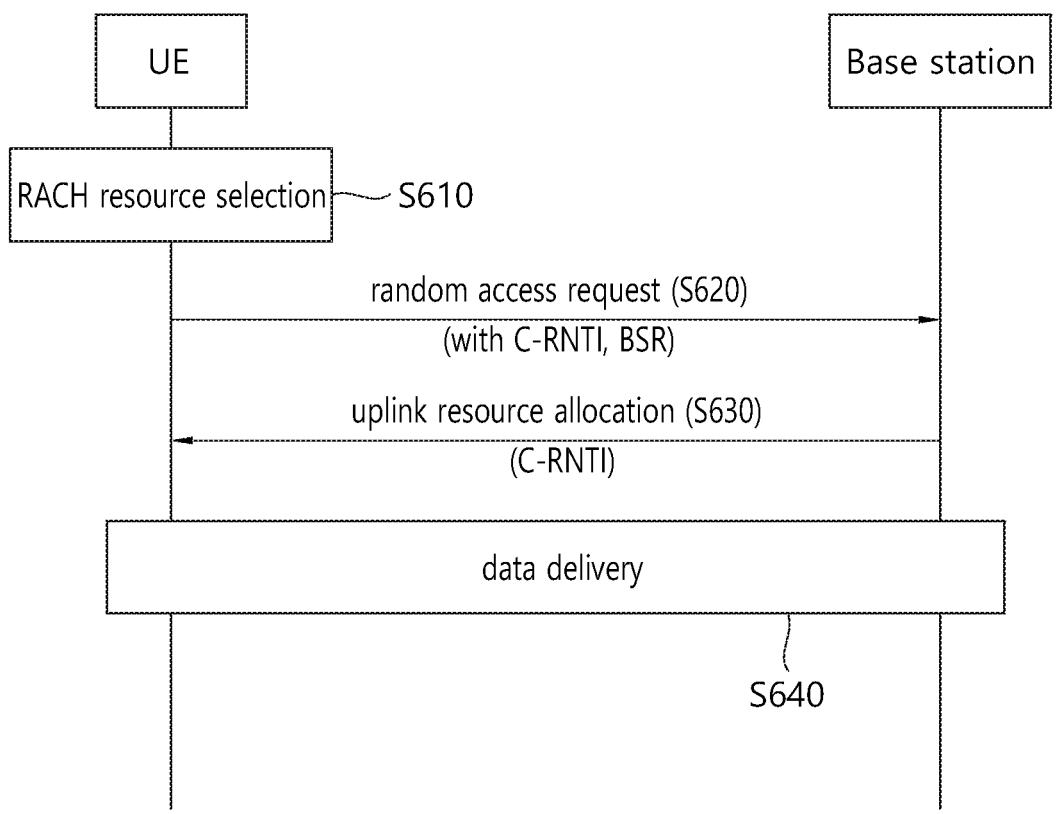
FIG. 6 shows a random access procedure after an initial access in a CIoT system.
Figure 7:
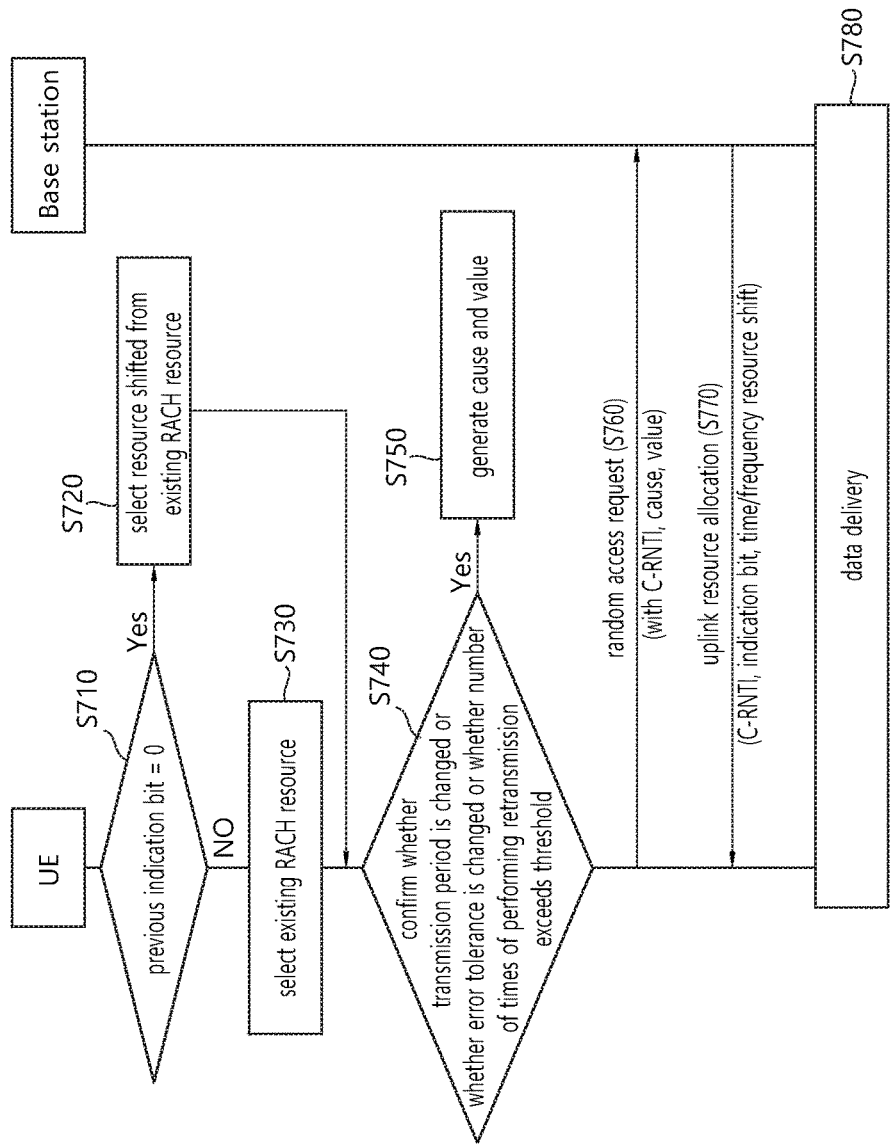
FIG. 7 shows a random access procedure after an initial access in a CIoT system.

FIG. 6 and FIG. 7 show a random access procedure after an initial access in a CIoT system.

Likewise, FIG. 6 shows a random access procedure not utilizing a periodicity of traffic transmission after an initial access, and FIG. 7 shows a random access procedure utilizing the periodicity of traffic transmission after the initial access.

Referring to FIG. 6, in step S610, a UE selects an RACH resource for transmitting a random access request. In step S620, unlike in FIG. 4 and FIG. 5, the random access request including a cell-radio network temporary identifier (C-RNTI) and a buffer scheduling request (BSR) is transmitted through an RACH resource. In step S630, if a C-RNTI unique to the UE is allocated to the UE through an uplink resource allocation, since it means that a random access attempt is successful, data can be delivered in step S640. If the UE supports an asynchronous transmission mode, the UE receives the random number through the uplink resource allocation information, and does not receive timing advance (TA) information related to a timing synchronization with the base station. That is, the UE performs a random access on the base station without receiving the TA information from the base station.

However, since the random access request of step S620 is based on contention even after the initial access, it shall be retried when a collision occurs. In order to mitigate the collision, the content of FIG. 7 is described as follows.

Referring to FIG. 7, first in step S710, it is checked whether a previous indication bit is 0.

If the previous indication bit is 0, in step S720, a resource shifted from the existing RACH resource is selected. As described below, a base station may determine an RACH resource shift zone within an error tolerance of a transmission period of a random access request, and may randomly select a time/frequency resource in the RACH resource shift zone. On the other hand, if the previous indication bit is 1, in step S730, the existing RACH resource is selected.

In step S740, if it confirmed whether the transmission period of the random access request is changed, the error tolerance of the transmission period of the random access request is changed, and the number of time of retransmitting the random access request exceeds a threshold. If so, in step S750, a cause and a value are generated and transmitted as a C-RNTI of a UE. As shown in the following table, the cause may be represented by two bits to indicate that each value is changed.

TABLE 1

| cause | value |
|---|---|
| 00 | BSR |
| 01 | transmission period |
| 10 | error tolerance |
| 11 | the number of times of performing retransmission |

In step S760, the random access request which includes the C-RNTI, the cause, and the value is transmitted to report that the value is updated. In step S770, the base station allocates an uplink resource by determining an indication bit and a shift for a time/frequency resource by the use of the transmission period of the random access request, the error tolerance, and the number of times of performing retransmission which are changed based on the updated value. When a time at which the random access request is successful is out of the error tolerance of the transmission period of the random access request, the indication bit is 0, and thus the base station reports information regarding the time/frequency resource shift to the UE.

In step S770, if a C-RNTI unique to the UE is allocated to the UE through an uplink resource allocation, since it means that a random access attempt is successful, data can be delivered in step S780. In addition, if the UE supports an asynchronous transmission mode, the UE receives the random number through the uplink resource allocation information, and does not receive timing advance (TA) information related to a timing synchronization with the base station. That is, the UE performs a random access on the base station without receiving the TA information from the base station.

In summary, if there are UEs periodically attempting a random access and if a base station knows that such UEs attempt the random access in a certain time duration, the base station informs the UE about information regarding a time/frequency resource, thereby reducing a collision probability. According to a transmission period of a random access request and the number of times of continuously retransmitting the random access request, the base station may determine a desired time at which a corresponding UE will transmit next data. According to information collected in this manner, a time duration in which the UE intensively attempts the random access can be known. In addition, since corresponding UEs are informed of information regarding a time/frequency resource shift by considering an error tolerance of a transmission period, a collision rate can be decreased.

Hereinafter, various embodiments to which the present specification is applied are described.

First Embodiment

In the first embodiment, it is assumed that there are a random access request from three UEs in an $n^{th}$ slot and a random access request from two UEs in an $(n+1)^{th}$ slot in a situation where four subcarriers are allocated as an RACH resource. In addition, there is almost no random access request in an RACH resource of a previous slot. Herein, a slot is a criterion for a time at which the RACH resource is received. That is, the $(n+1)^{th}$ slot indicates a time of an RACH resource of a slot next to the $n^{th}$ slot Information of each UE is as follows.

TABLE 2

| UE ID | transmission period | number of times of performing retransmission | error tolerance of transmission period |
|---|---|---|---|
| 1 ($n^{th}$ reception) | 30 minutes | 0 | 3% |
| 2 ($n^{th}$ reception) | 1 hour | 0 | 3% |
| 3 ($(n+1)^{th}$ reception) | 2 hours | 1 | 2% |
| 4 $n^{th}$ reception) | 1 day | 0 | 1% |
| 5 ($(n+1)^{th}$ reception) | 2 hours | 1 | 2% |

Specifically, all of UEs 1, 2, 3, 4, and 5 attempt a random access in the $n^{th}$ slot, and among them, the UEs 3 and 5 collide with each other and thus retry the random access also in the $(n+1)^{th}$ slot. If the number of times of performing retransmission of the UEs 3 and 5 is 1, it means that the random access attempt is performed again in the $(n+1)^{th}$ slot. That is, the UEs 1, 2, and 4 successfully transmit the random access request in the $n^{th}$ slot, and the UEs 3 and 5 successfully transmit the random access request in the $(n+1)^{th}$ slot. The base station may inversely use this information to know that the five UEs attempt the random access in the $n^{th}$ slot.

In addition, when each UE selects four subcarriers, the selection is achieved randomly. In addition, a collision which will occur at a later time may be predicted according to a transmission period. Therefore, there is a high probability that the UEs 1 and 2 collide after 30 minutes from the $(n+1)^{th}$ slot, and there is a high probability that the UEs 1, 2, 3, and 5 collide after one hour and 30 minutes. There is a high probability that all of the UEs 1, 2, 3, 4, and 5 collide after 23 hours and 30 minutes.

Specifically, the following steps are performed in the first embodiment.

First, terminologies are summarized. A first random access request corresponds to a case where a UE first attempts a random access. A second random access request corresponds to a case where the UE attempts the random access again in a next transmission period of the first random access request. A radio resource corresponds to an RACH resource. When it is said that the first random access request and the second random access request are transmitted through the radio resource, it means that a random access attempt is successful.

The radio resource for transmitting the first random access request is selected. That is, the RACH resource is selected.

The UE transmits the first random access request through the radio resource. The first random access request includes a transmission period of the first random access request, the number of times of retransmitting the first random access request, and an error tolerance of the transmission period of the first random access request.

The transmission period of the first random access request is a period of retransmitting the random access request. Herein, it corresponds to a time between the transmission time of the first random access request and the transmission time of the second random access request. The number of times of retransmitting the first random access request is the number of times of attempting a random access until the first random access request is successfully transmitted. The error tolerance of the first random access request is a measure of determining how sensitive the UE is with respect to time (for example, an error of one minute is tolerable even if information must be transmitted every one hour).

The UE receives uplink resource allocation information in response to the first random access request. The uplink resource allocation information includes an indication bit and information regarding a radio resource shift.

If the first random access request of the UE is successfully transmitted, the base station determines an indication bit on the basis of the number of times of retransmitting the first random access request and an error tolerance of a transmission period of the first random access request. According to the number of times of retransmitting the first random access, the base station may inversely estimate a specific time duration in which the UEs intensively attempt the random access. In addition, according to the transmission period of the first random access request, it may be predicted whether a random access request to be transmitted at a later time is collided. In addition, according to the error tolerance of the transmission period of the first random access request, a radio resource zone to be shifted may be determined.

If the indication bit is not a predetermined value, the second random access request is transmitted through a radio resource shifted from a radio resource for transmitting the first random access request.

If the number of times of retransmitting the first random access request exceeds a threshold and a time at which the first random access request is successfully transmitted is out of the error tolerance of transmission period of the first random access request, the indication bit is not the predetermined value. In addition, the radio resource is randomly shifted on the basis of the radio resource shift information received from the base station. The radio resource shift information indicates a radio resource within the error tolerance of the transmission period of the first random access request.

Second Embodiment

Figure 8:
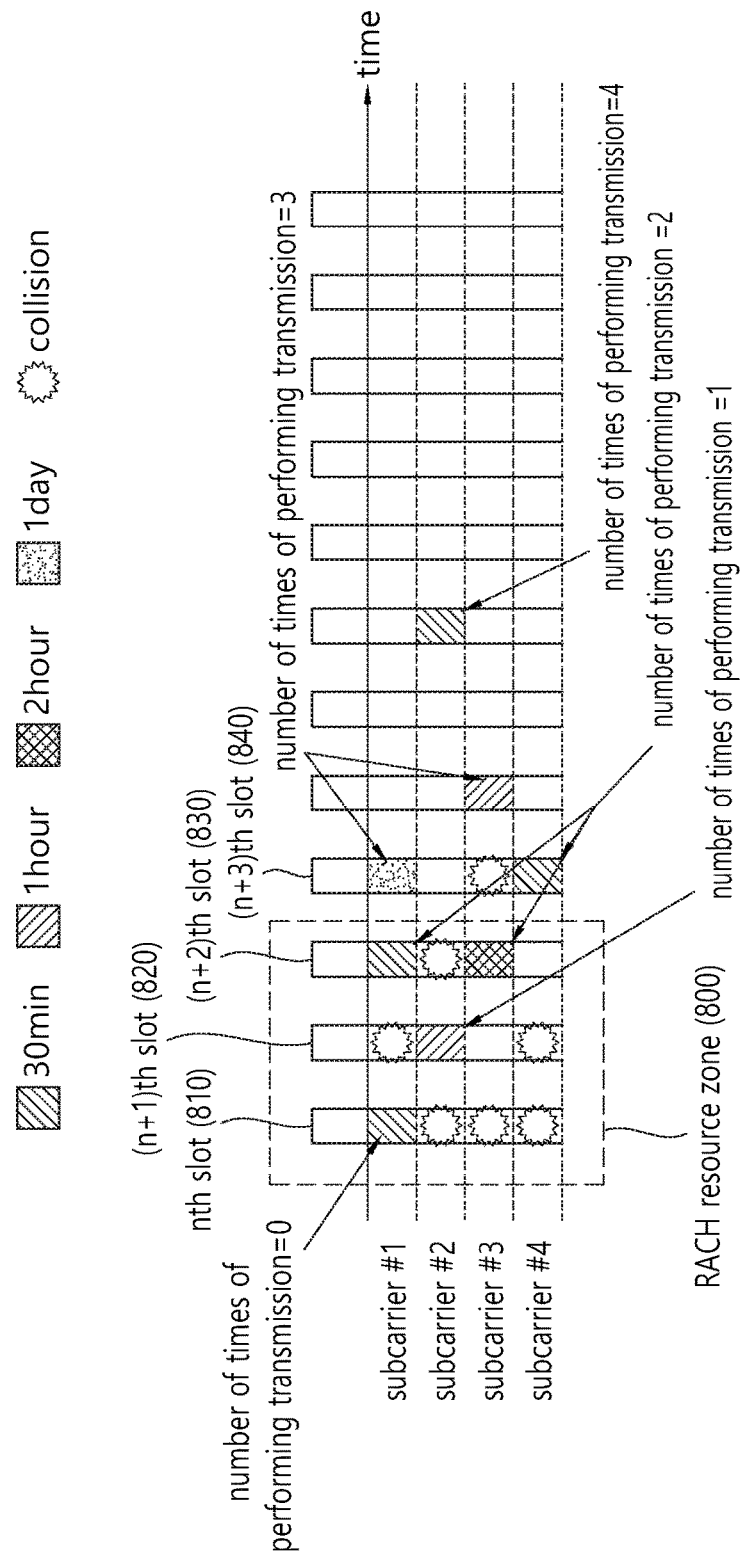
FIG. 8 shows a collision on a time/frequency resource for a random access request of UEs and a retry of the random access request.

FIG. 8 shows a collision on a time/frequency resource for a random access request of UEs and a retry of the random access request.

The second embodiment will be described with reference to FIG. 8. As described above in the first embodiment, a base station may predict a specific time point (slot) at which the UEs intensively attempt a random access through a transmission period and/or the number of times of performing retransmission.

It is assumed in FIG. 8 that there are four UEs having a transmission period of 30 minutes, two UEs having a transmission period of one hour, one UE having a transmission period of two hours, and one UE having a transmission period of one day in a situation where four subcarriers are allocated as an RACH resource. It is shown in FIG. 8 that a random access is retried through a timer due to a collision of the UEs, and thus the random access request is transmitted on the RACH resource.

It may be estimated that a plurality of UEs attempt the random access request in a specific time duration (slot) through the number of times of performing retransmission. In FIG. 8, the base station may know that an $n^{th}$ slot 810 is a specific time duration in which all UEs first attempt the random access in practice. This may be known through a fact that the number of times of performing retransmission is 0 for a UE of which a transmission period received in an $n^{th}$ slot 810 is 30 minutes, the number of times of performing retransmission is 1 for a UE of which a transmission period received in an $(n+1)^{th}$ slot 820 is 1 hour, the number of times of performing retransmission is 2 for a UE of which a transmission period received in an $(n+2)^{th}$ slot 830 is 2 hours, and the number of times of performing retransmission is 3 for a UE of which a transmission period received in an $(n+3)^{th}$ slot 840 is 1 day. That is, although the base station receives only a successful random access request of the UE in practice, a specific time at which a collision occurs may be known since information regarding the number of times of performing retransmission caused by a failure in a random access attempt is known. In addition, since a transmission period of each UE is also known, a specific time at which the collision will occur at a later time may be predicted. For example, it may be predicted that a collision may occur among four UEs having a transmission period of 30 minutes after next 30 minutes by utilizing information regarding the transmission period. However, if a maximum RACH retry timer indicates a time greater than an interval between slots, an accurate time point cannot be known through the number of times of performing retransmission, but may be predicted to some extents through the time of the timer.

In addition, an RACH resource zone 800 may be formed through an error tolerance of a transmission period received from the UE. UEs in the RACH resource zone 800 are UEs within the error tolerance. If a time at which the random access request of each UE is successful is out of the error tolerance of the transmission period, that is, is out of the RACH resource zone 800, and if the number of times of performing retransmission exceeds a threshold, the base station additionally transmits an indication bit 0 and information regarding a time/frequency shift based thereon. On the contrary, if the time at which the random access request of each UE is successful is not out of the error tolerance of the transmission period, that is, is within the RACH resource zone 800, and if the number of times of performing retransmission does not exceed the threshold, the base station delivers only the indication bit 1, and the UE directly uses a time/frequency resource for transmitting the random access request also in a next period.

Specifically, the following steps are performed in the second embodiment.

First, terminologies are summarized. A first random access request corresponds to a case where a UE first attempts a random access. A second random access request corresponds to a case where the UE attempts the random access again in a next transmission period of the first random access request. A radio resource corresponds to an RACH resource. When it is said that the first random access request and the second random access request are transmitted through the radio resource, it means that a random access attempt is successful.

The radio resource for transmitting the first random access request is selected. That is, the RACH resource is selected.

The UE transmits the first random access request through the radio resource. The first random access request includes a transmission period of the first random access request, the number of times of retransmitting the first random access request, and an error tolerance of the transmission period of the first random access request.

The transmission period of the first random access request is a period of retransmitting the random access request. Herein, it corresponds to a time between the transmission time of the first random access request and the transmission time of the second random access request. The number of times of retransmitting the first random access request is the number of times of attempting a random access until the first random access request is successfully transmitted. The error tolerance of the first random access request is a measure of determining how sensitive the UE is with respect to time (for example, an error of one minute is tolerable even if information must be transmitted every one hour).

The UE receives uplink resource allocation information in response to the first random access request. The uplink resource allocation information includes an indication bit and information regarding a radio resource shift.

If the first random access request of the UE is successfully transmitted, the base station determines an indication bit on the basis of the number of times of retransmitting the first random access request and an error tolerance of a transmission period of the first random access request. According to the number of times of retransmitting the first random access, the base station may inversely estimate a specific time duration in which the UEs intensively attempt the random access. In addition, according to the transmission period of the first random access request, it may be predicted whether a random access request to be transmitted at a later time is collided. In addition, according to the error tolerance of the transmission period of the first random access request, a radio resource zone to be shifted may be determined.

If the indication bit is not a predetermined value, the second random access request is transmitted through a radio resource shifted from a radio resource for transmitting the first random access request.

If the number of times of retransmitting the first random access request exceeds a threshold and a time at which the first random access request is successfully transmitted is out of the error tolerance of transmission period of the first random access request, the indication bit is not the predetermined value. In addition, the radio resource is randomly shifted on the basis of the radio resource shift information received from the base station. The radio resource shift information indicates a radio resource within the error tolerance of the transmission period of the first random access request.

Third Embodiment

The third embodiment is described with reference to FIG. 9 to FIG. 11.

Upon receiving an indication bit 1, a UE directly uses a time/frequency resource for transmitting a random access request also in a next period. On the other hand, upon receiving an indication bit 0, the UE additionally receives information regarding a time/frequency resource shift. The time/frequency resource shift is calculated by indicating the information in a bit format and is used for transmission of the random access request in a shifted resource.

Figure 9:
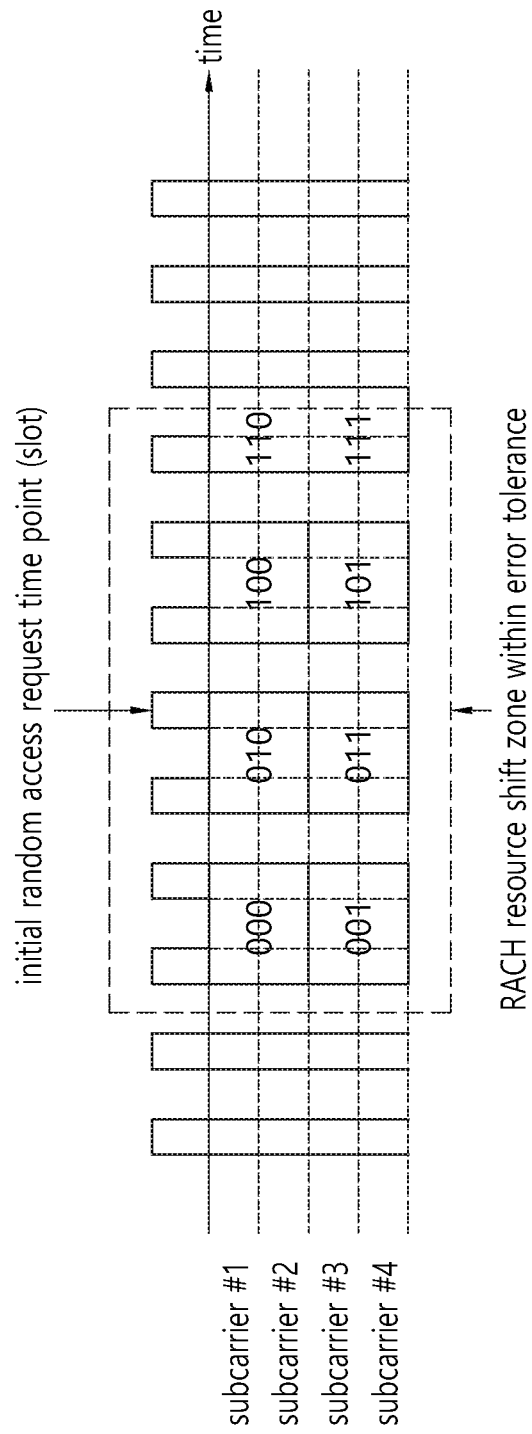
FIG. 9 shows an RACH resource shift zone represented in a bit format.

FIG. 9 shows an RACH resource shift zone represented in a bit format.

In FIG. 9, in a situation where four subcarriers are allocated as an RACH resource, a time for an error tolerance of a transmission period is 1 minute, and information regarding a time/frequency resource shift is given with 3 bits. In this case, an RACH resource shift zone may be formed according to a slot in which a random access request is first transmitted. Herein, the total number of time/frequency resources is 7×4=28. To express this with 3 bit, mapping may be achieved as shown in FIG. 9. First 2 bits may represent a time domain, and the remaining last 1 bit may represent a frequency domain.

Figure 10:
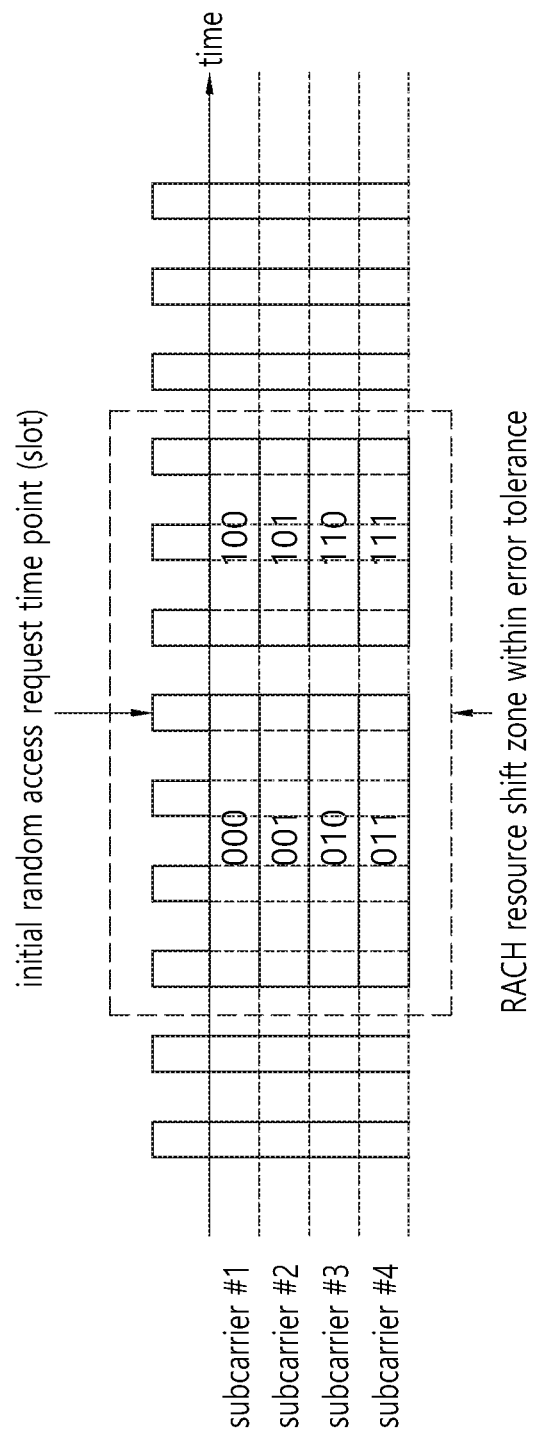
FIG. 10 shows an RACH resource shift zone in a bit format.

FIG. 10 shows an RACH resource shift zone in a bit format.

In FIG. 10, in the same situation as shown in FIG. 9, a first 1 bit out of 3 bits corresponding to information bits for a time/frequency resource shift represents a time domain, and the remaining 2 bits represent a frequency domain.

Figure 11:
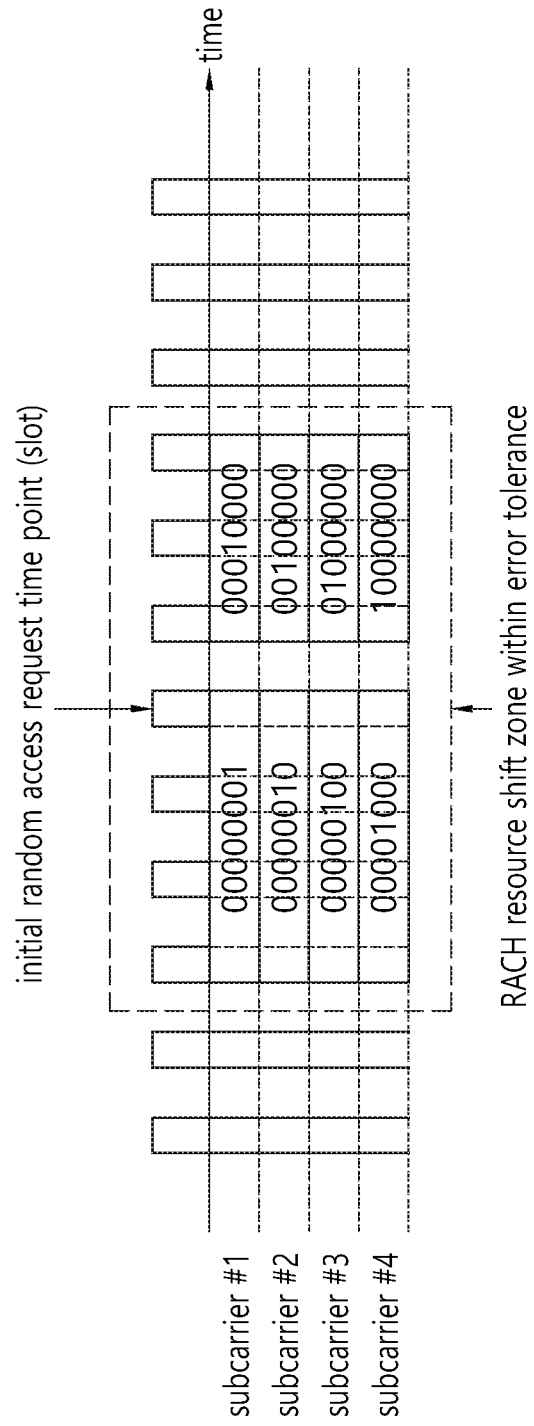
FIG. 11 shows an RACH resource shift zone in a bitmap format.

FIG. 11 shows an RACH resource shift zone in a bitmap format.

Unlike in FIG. 9 and FIG. 10, it is shown in FIG. 11 that an RACH resource shift zone is allocated in a bitmap format. In this case, a plurality of RACH resource shift zones may also be allocated. For example, three RACH resource shift zones may be allocated by setting the allocation of the RACH resource shift zone to 11000001.

Referring to FIG. 9 to FIG. 11, a UE of which an error tolerance of a transmission period is great is expected to have a great RACH resource shift zone, and thus may be shifted in a much wider duration. On the other hand, a UE of which an error tolerance of a transmission period is small is expected to have a small RACH resource shift zone, and thus may be shifted in a much narrower duration. In addition, the RACH resource shift zone may be configured by an agreement of a base station and a UE when it is represented in a bit or bitmap format.

Specifically, the following steps are performed in the third embodiment.

First, terminologies are summarized. A first random access request corresponds to a case where a UE first attempts a random access. A second random access request corresponds to a case where the UE attempts the random access again in a next transmission period of the first random access request. A radio resource corresponds to an RACH resource. When it is said that the first random access request and the second random access request are transmitted through the radio resource, it means that a random access attempt is successful.

The radio resource for transmitting the first random access request is selected. That is, the RACH resource is selected.

The UE transmits the first random access request through the radio resource. The first random access request includes a transmission period of the first random access request, the number of times of retransmitting the first random access request, and an error tolerance of the transmission period of the first random access request.

The transmission period of the first random access request is a period of retransmitting the random access request. Herein, it corresponds to a time between the transmission time of the first random access request and the transmission time of the second random access request. The number of times of retransmitting the first random access request is the number of times of attempting a random access until the first random access request is successfully transmitted. The error tolerance of the first random access request is a measure of determining how sensitive the UE is with respect to time (for example, an error of one minute is tolerable even if information must be transmitted every one hour).

The UE receives uplink resource allocation information in response to the first random access request. The uplink resource allocation information includes an indication bit and information regarding a radio resource shift.

If the first random access request of the UE is successfully transmitted, the base station determines an indication bit on the basis of the number of times of retransmitting the first random access request and an error tolerance of a transmission period of the first random access request. According to the number of times of retransmitting the first random access, the base station may inversely estimate a specific time duration in which the UEs intensively attempt the random access. In addition, according to the transmission period of the first random access request, it may be predicted whether a random access request to be transmitted at a later time is collided. In addition, according to the error tolerance of the transmission period of the first random access request, a radio resource zone to be shifted may be determined.

If the indication bit is not a predetermined value, the second random access request is transmitted through a radio resource shifted from a radio resource for transmitting the first random access request.

If the number of times of retransmitting the first random access request exceeds a threshold and a time at which the first random access request is successfully transmitted is out of the error tolerance of transmission period of the first random access request, the indication bit is not the predetermined value. In addition, the radio resource is randomly shifted on the basis of the radio resource shift information received from the base station. The radio resource shift information indicates a radio resource within the error tolerance of the transmission period of the first random access request.

Figure 12:
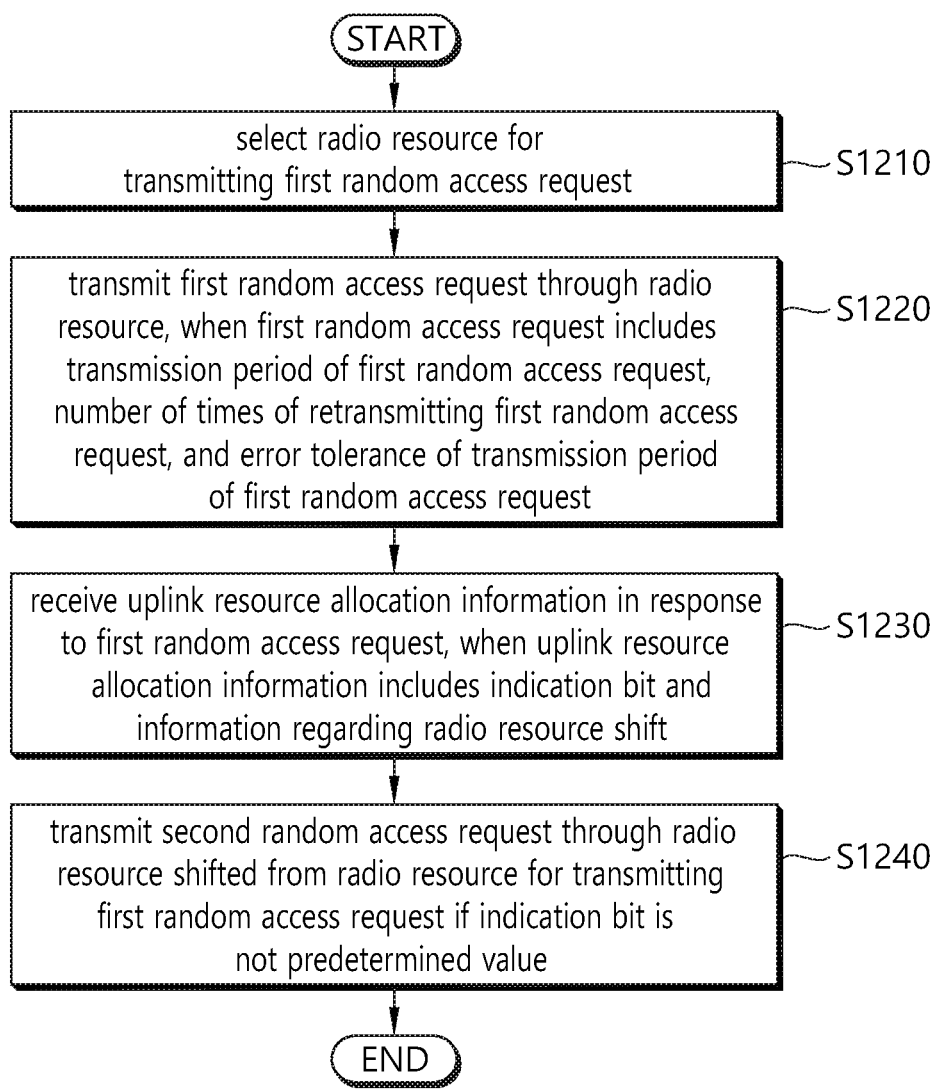
FIG. 12 is a flowchart showing a random access procedure of a UE according to an embodiment of the present specification.

FIG. 12 is a flowchart showing a random access procedure of a UE according to an embodiment of the present specification.

First, terminologies are summarized. A first random access request corresponds to a case where a UE first attempts a random access. A second random access request corresponds to a case where the UE attempts the random access again in a next transmission period of the first random access request. A radio resource corresponds to an RACH resource. When it is said that the first random access request and the second random access request are transmitted through the radio resource, it means that a random access attempt is successful.

Referring to FIG. 12, in step S1210, the radio resource for transmitting the first random access request is selected. That is, the RACH resource is selected.

In step S1220, the UE transmits the first random access request through the radio resource. The first random access request includes a transmission period of the first random access request, the number of times of retransmitting the first random access request, and an error tolerance of the transmission period of the first random access request.

The transmission period of the first random access request is a period of retransmitting the random access request. Herein, it corresponds to a time between the transmission time of the first random access request and the transmission time of the second random access request. The number of times of retransmitting the first random access request is the number of times of attempting a random access until the first random access request is successfully transmitted. The error tolerance of the first random access request is a measure of determining how sensitive the UE is with respect to time (for example, an error of one minute is tolerable even if information must be transmitted every one hour).

In step S1230, the UE receives uplink resource allocation information in response to the first random access request. The uplink resource allocation information includes an indication bit and information regarding a radio resource shift.

If the first random access request of the UE is successfully transmitted, the base station determines an indication bit on the basis of the number of times of retransmitting the first random access request and an error tolerance of a transmission period of the first random access request. According to the number of times of retransmitting the first random access, the base station may inversely estimate a specific time duration in which the UEs intensively attempt the random access. In addition, according to the transmission period of the first random access request, it may be predicted whether a random access request to be transmitted at a later time is collided. In addition, according to the error tolerance of the transmission period of the first random access request, a radio resource zone to be shifted may be determined.

In step S1240, if the indication bit is not a predetermined value, the second random access request is transmitted through a radio resource shifted from a radio resource for transmitting the first random access request.

If the number of times of retransmitting the first random access request exceeds a threshold and a time at which the first random access request is successfully transmitted is out of the error tolerance of transmission period of the first random access request, the indication bit is not the predetermined value. In addition, the radio resource is randomly shifted on the basis of the radio resource shift information received from the base station. The radio resource shift information indicates a radio resource within the error tolerance of the transmission period of the first random access request.

Figure 13:
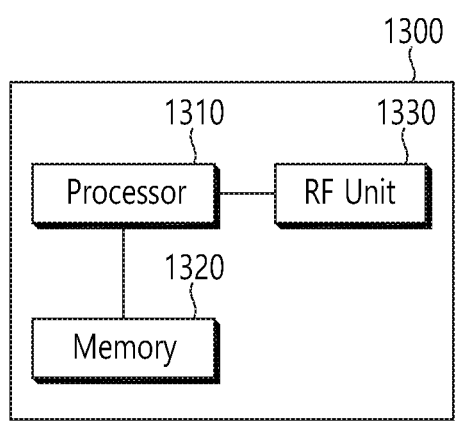
FIG. 13 is a block diagram showing an apparatus for wireless communication for implementing an embodiment of the present invention.

FIG. 13 is a block diagram showing a device for wireless communication for implementing an embodiment of the present invention.

The device 1300 for wireless communication includes a processor 1310, a memory 1320 and a radio frequency (RF) unit 1330.

The processor 1310 may be configured to implement proposed functions, procedures and/or methods described in this description. Layers of the radio interface protocol may be implemented in the processor 1310. The processor 1310 may handle a procedure explained above. The memory 1320 is operatively coupled with the processor 1310, and the RF unit 1330 is operatively coupled with the processor 1310.

The processor 1310 may include application-specific integrated circuit (ASIC), other chipset, logic circuit and/or data processing device. The memory 1320 may include read-only memory (ROM), random access memory (RAM), flash memory, memory card, storage medium and/or other storage device. The RF unit 1330 may include baseband circuitry to process radio frequency signals. When the embodiments are implemented in software, the techniques described herein can be implemented with modules (e.g., procedures, functions, and so on) that perform the functions described herein. The modules can be stored in memory 1320 and executed by processor 1310. The memory 1320 can be implemented within the processor 1310 or external to the processor 1310 in which case those can be communicatively coupled to the processor 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing, by a terminal, a random access in a wireless communication system, the method comprising:
    selecting a radio resource for transmitting a first random access request;
    transmitting the first random access request through the radio resource, wherein the first random access request comprises a transmission period of the first random access request, the number of times of retransmitting the first random access request, and an error tolerance of the transmission period of the first random access request;
    receiving uplink resource allocation information in response to the first random access request, wherein the uplink resource allocation information comprises an indication bit and information regarding a radio resource shift; and
    transmitting a second random access request through a radio resource shifted from the radio resource if the indication bit is not a predetermined value.

2. The method of claim 1, wherein if the terminal supports an asynchronous transmission mode, the first random access request further comprises a random number generated by the terminal, the random number is received through the uplink resource allocation information, and timing advance (TA) information related to a timing synchronization with a base station is not received.

3. The method of claim 1, wherein the indication bit is determined on the basis of the number of times of retransmitting the first random access request and the error tolerance of the transmission period of the first random access request.

4. The method of claim 1, wherein if the indication bit is the predetermined value, the second random access request is transmitted through the radio resource.

5. The method of claim 4,
    wherein the indication bit is not the predetermined value if the number of times of retransmitting the first random access request exceeds a threshold and a time at which the first random access request is successfully transmitted is out of the error tolerance of the transmission period of the first random access request, and
    wherein the indication bit is the predetermined value if the number of times of retransmitting the first random access request does not exceed the threshold and the time at which the first random access request is successfully transmitted is not out of the error tolerance of the transmission period of the first random access request.

6. The method of claim 1, wherein the radio resource is randomly shifted on the basis of the information regarding the radio resource shift.

7. The method of claim 1, wherein the information regarding the radio resource shift indicates a radio resource within the error tolerance of the transmission period of the first random access request.

8. The method of claim 1, wherein the second random access request is transmitted in a next transmission period of the first random access request.

9. A terminal for performing a random access in a wireless communication system, the terminal comprising:
    a radio frequency (RF) unit for transmitting and receiving a radio signal; and
    a processor operatively coupled to the RF unit, wherein the processor is configured for:
    selecting a radio resource for transmitting a first random access request;
    transmitting the first random access request through the radio resource, wherein the first random access request comprises a transmission period of the first random access request, the number of times of retransmitting the first random access request, and an error tolerance of the transmission period of the first random access request;
    receiving uplink resource allocation information in response to the first random access request, wherein the uplink resource allocation information comprises an indication bit and information regarding a radio resource shift; and transmitting a second random access request through a radio resource shifted from the radio resource if the indication bit is not a predetermined value.

\* \* \* \* \*